(12) United States Patent
Hsu et al.

(10) Patent No.: US 9,258,711 B2
(45) Date of Patent: Feb. 9, 2016

(54) WIRELESS COMMUNICATION SYSTEM AND AUTHENTICATION METHOD THEREOF

(71) Applicant: Institute For Information Industry, Taipei (TW)

(72) Inventors: Chun-Yen Hsu, Taipei (TW); Chiu-Wen Chen, Taipei (TW); Feng-Ming Yang, Taipei (TW)

(73) Assignee: Institute For Information Industry, Taipei (TW)

( * ) Notice: Subject to any disclaimer, the term of this patent is extended or adjusted under 35 U.S.C. 154(b) by 50 days.

(21) Appl. No.: 14/330,891

(22) Filed: Jul. 14, 2014

(65) Prior Publication Data

US 2015/0023247 A1    Jan. 22, 2015

Related U.S. Application Data

(60) Provisional application No. 61/846,653, filed on Jul. 16, 2013.

(51) Int. Cl.
*H04W 12/06* (2009.01)
*H04W 64/00* (2009.01)

(52) U.S. Cl.
CPC ............ *H04W 12/06* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 2011/0110249 | A1* | 5/2011 | Schuringa | H04W 8/265 370/252 |
| 2011/0170517 | A1* | 7/2011 | Bakker | H04W 36/0033 370/331 |
| 2012/0039472 | A1* | 2/2012 | Liu | H04W 12/04 380/270 |
| 2012/0202491 | A1* | 8/2012 | Fox | H04B 7/2609 455/435.1 |
| 2012/0311335 | A1* | 12/2012 | Fransen | H04L 63/06 713/170 |
| 2013/0013923 | A1* | 1/2013 | Thomas | H04W 12/06 713/168 |
| 2013/0155948 | A1* | 6/2013 | Pinheiro | H04W 4/005 370/328 |

* cited by examiner

*Primary Examiner* — Brian Roberts
(74) *Attorney, Agent, or Firm* — Skaar Ulbrich Macari, P.A.

(57) ABSTRACT

A wireless communication system and an authentication method thereof are provided. The wireless communication system includes a User Equipment (UE), an Evolved Node B (eNodeB), a Home Subscriber Server (HSS), and a Mobility Management Entity (MME). Before the UE enters an Attachment Procedure, the MME is configured to acquire an Authentication Vector from the HSS in advance, and transmit, based on the Authentication Vector, a first Authentication Vector corresponding to the UE to the UE and a second Authentication Vector corresponding to the eNodeB to the eNodeB in advance. The eNodeB is configured to transmit a UE identifier to the UE. The UE is configured to complete an Authentication procedure with the eNodeB according to the UE identifier and the Authentication Vector.

14 Claims, 4 Drawing Sheets

WIRELESS COMMUNICATION SYSTEM AND AUTHENTICATION METHOD THEREOF

PRIORITY

This application claims priority to U.S. Provisional Patent Application No. 61/846,653 filed on Jul. 16, 2013, which is hereby incorporated by reference herein in its entirety.

FIELD

The present invention relates to a communication system and an authentication method thereof. More particularly, the present invention relates to a wireless communication system and an authentication method thereof.

BACKGROUND

In recent years, the Long Term Evolution (LTE) technology of the 3rd Generation Partnership Project (3GPP) has been widely viewed as the basic architecture of the next generation of wireless communication systems. Under this architecture and in consideration of the security and capability, an authentication procedure must be accomplished between a User Equipment (UE), an Evolved Node B (eNodeB), a Mobility Management Entity (MME) and a Home Subscriber Server (HSS) during an attachment procedure performed by the UE. Therefore, it is conceivable that signaling exchanges generated between the UE, the eNodeB, the MME and the HSS during the authentication procedure will necessarily consume much time and many resources.

Accordingly, an urgent need exists in the art to provide a solution to simplify the signaling exchanges needed for the authentication procedure during the attachment procedure performed by a UE under the basic architecture of the LTE technology of 3GPP.

SUMMARY

A primary objective includes simplifying signaling exchanges needed for an authentication procedure during an attachment procedure performed by a UE under the basic architecture of the LTE technology of 3GPP.

To achieve the aforesaid objective, certain embodiments of the present invention include a wireless communication system, which comprises a UE, an eNodeB, an HSS and an MME. The MME is configured to, before the UE enters an attachment procedure, acquire an authentication vector from the HSS in advance and transmit a first authentication vector of the authentication vector to the UE and a second authentication vector of the authentication vector to the eNodeB in advance. The first authentication vector corresponds to the UE and the second authentication vector corresponds to the eNodeB. The eNodeB is configured to transmit a UE identifier to the UE, and the UE is configured to complete an authentication procedure with the eNodeB according to the UE identifier and the authentication vector.

To achieve the aforesaid objective, certain embodiments of the present invention include an authentication method for use in a wireless communication system. The wireless communication system comprises a UE, an eNodeB, an HSS and an MME. The authentication method comprises the following steps of:

(a) acquiring an authentication vector from the HSS in advance by the MME before the UE enters an attachment procedure;

(b) transmitting a first authentication vector of the authentication vector to the UE and a second authentication vector of the authentication vector to the eNodeB in advance by the MME before the UE enters the attachment procedure, wherein the first authentication vector corresponds to the UE and the second authentication vector corresponds to the eNodeB;

(c) transmitting a UE identifier to the UE by the eNodeB; and (d) completing an authentication procedure with the eNodeB by the UE according to the UE identifier and the authentication vector.

According to the above descriptions, certain embodiments of the present invention include a wireless communication system and an authentication method thereof. More specifically, before a UE enters an attachment procedure, the present invention transmits information (e.g., an authentication vector) needed to be provided by an HSS during an authentication procedure to an MME in advance; and the MME also transmits the information to the UE and the eNodeB in advance. In this way, when the UE enters the attachment procedure, the authentication procedure will be simplified as being performed only between the UE and the eNodeB, so signaling exchanges needed in the conventional authentication procedure are effectively simplified. On the basis of the aforesaid operations, the present invention provides at least the following benefits: the load of the core network can be reduced; and the power consumption of the UE having a high switching frequency (e.g., a machine to machine device) can be reduced.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

Hereinafter, a brief description of the drawings is made, but this is not intended to limit the present invention.

DETAILED DESCRIPTION

In the following description, the present invention will be explained with reference to example embodiments thereof. However, these example embodiments are not intended to limit the present invention to the examples, embodiments, environment, applications or implementations described in these example embodiments. Therefore, description of these example embodiments is only for purpose of illustration rather than to limit the present invention. In the attached drawings, elements unrelated to the present invention are omitted from depiction; and dimensional relationships among individual elements are illustrated only for ease of understanding but not to limit the actual scale.

An embodiment of the present invention (called "a first embodiment" for short) is a wireless communication system.

Figure 1:
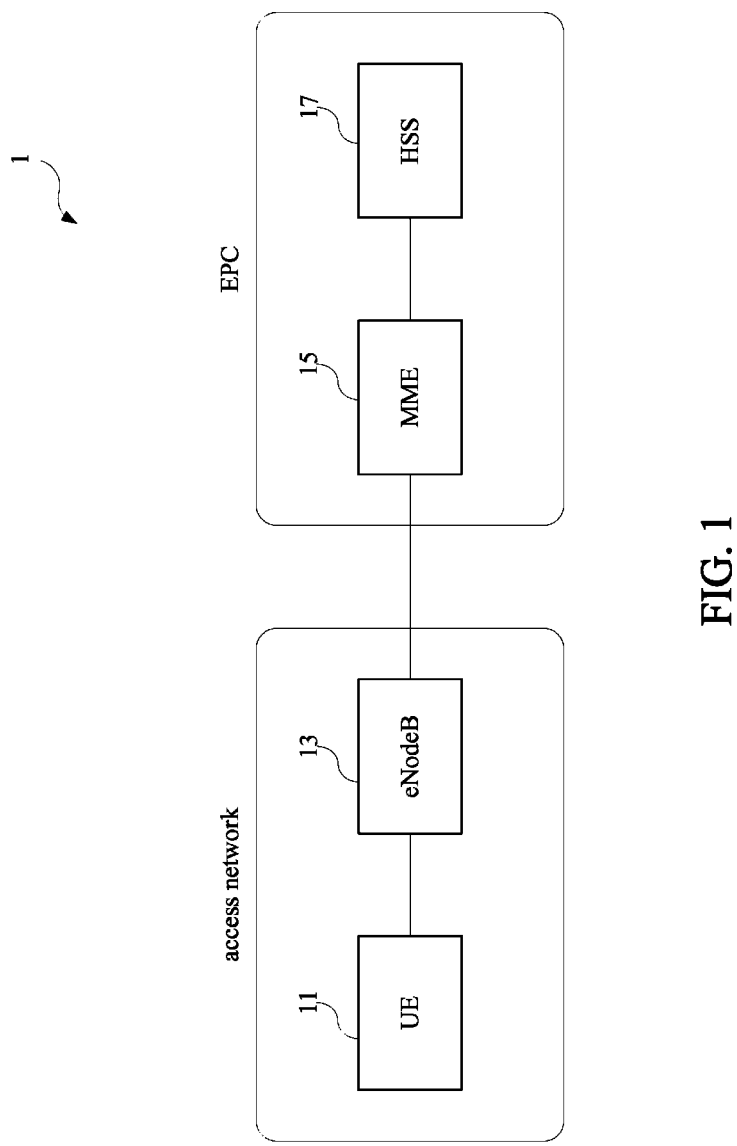
FIG. 1 is a schematic structural view of a wireless communication system 1 according to an embodiment of the present invention.

FIG. 1 is a schematic structural view of the wireless communication system. As shown in FIG. 1, the wireless communication system 1 conforms to the basic architecture of the LTE technology of 3GPP. Under this basic architecture, the wireless communication system 1 comprises at least one UE 11, at least one eNodeB 13, at least one MME 15 and at least one HSS 17. The basic architecture refers to standards that are formulated in accordance with the LTE series technologies, and the LTE series technologies comprise the LTE technology, the LTE-advanced technology and the predecessor technologies of the LTE technology. The predecessor technologies include, for example, a Universal Mobile Telecommunications System (UMTS) or a Global System for Mobile Communications (GSM) and etc.

Furthermore, the aforesaid basic architecture may be divided into two parts, namely, an access network and an Evolved Packet Core (EPC). Specifically, the access network comprises the UE 11 and the eNodeB 13, and the EPC comprises the MME 15 and the HSS 17 as well as at least one Serving Gateway (S-GW) and at least one Packet Data Network Gateway (P-GW). Because the S-GW and the P-GW are not directly related to this embodiment, they are not depicted in the drawings. Furthermore, basic operations, the communication manner and the connections of the UE 11, the eNodeB 13, the MME 15, the HSS 17, the S-GW and the P-GW can all be known from the standards formulated in accordance with the LTE series technologies, so only contents directly related to the present invention will be described hereinafter.

Figure 2:
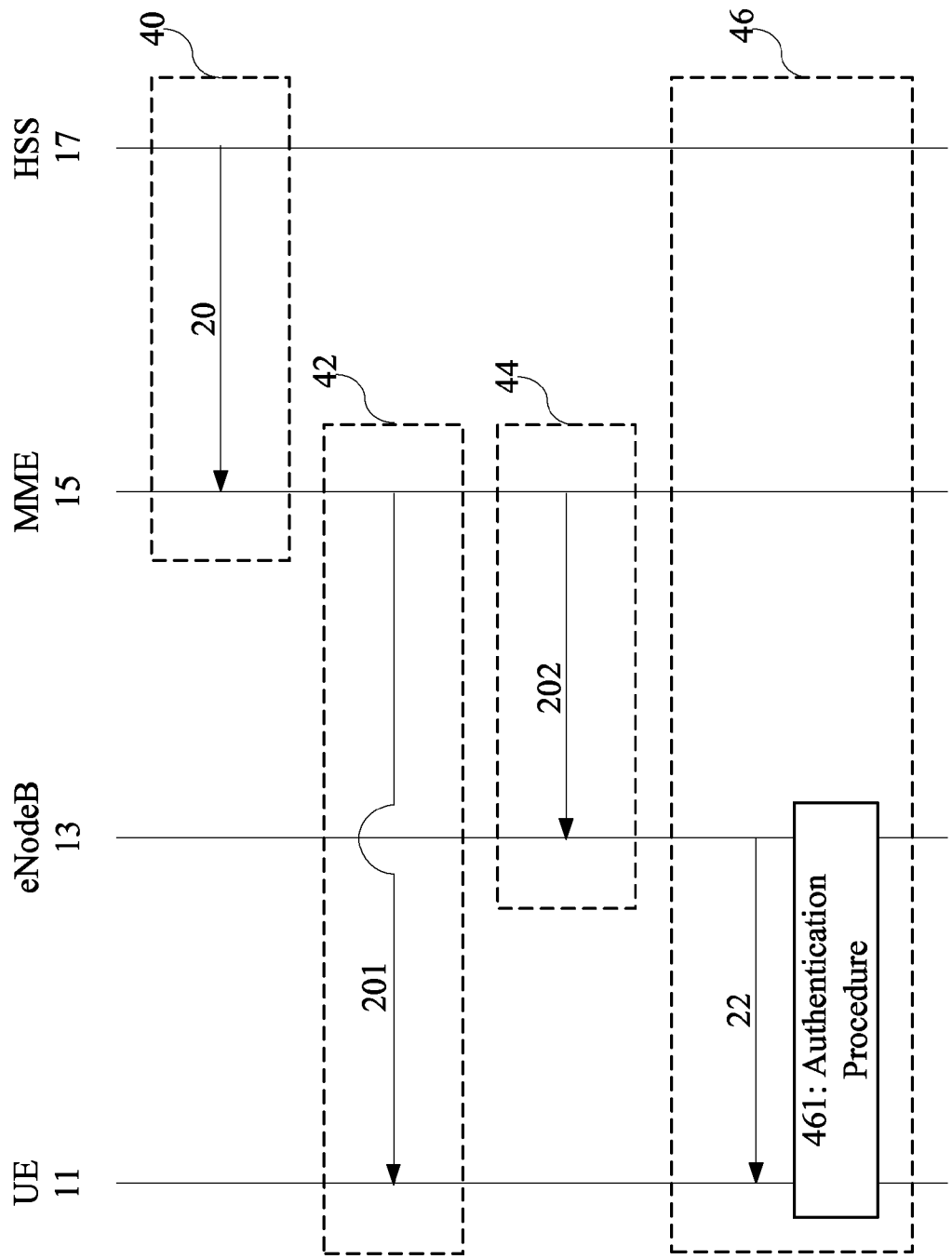
FIG. 2 is a schematic view illustrating operations of the wireless communication system 1 shown in FIG. 1.

FIG. 2 is a schematic view illustrating operations of the wireless communication system 1. As shown in FIG. 2, before the UE 11 enters an attachment procedure 46 with the eNodeB 13, the MME 15 and the HSS 17, the MME 15 has acquired an authentication vector 20 from the HSS 17 in advance and has transmitted a first authentication vector 201 of the authentication vector 20 to the UE 11 and a second authentication vector 202 of the authentication vector 20 to the eNodeB 13 in advance. The first authentication vector 201 corresponds to the UE 11 and the second authentication vector 202 corresponds to the eNodeB 13. The authentication vector 20 may comprise any authentication information needed to be provided by the HSS 17 when the UE 11 performs the attachment procedure 46. For example, this authentication information may comprise but not limited to, the Random Number (RAND), the Expected Response (XRES), the Access Security Management Entity ($K_{ASME}$), the Authentication Token (AUTN) and etc. The first authentication vector 201 and the second authentication vector 202 may comprise all or a part of the contents of the authentication vector 20.

The MME 15 may acquire the authentication vector 20 from the HSS 17 in advance through an authentication data procedure 40. More specifically, during the authentication data procedure 40, the MME 15 may send an authentication data request signaling to the HSS 17, and then the HSS 17 may transmit an authentication data response signaling which comprises the authentication vector 20 to the MME 15 in response to the authentication data request.

After having acquired the authentication vector 20, the MME 15 may transmit the first authentication vector 201 to the UE 11 in advance through a detachment procedure 42. The attachment of the UE 11 must be accomplished through an attachment procedure, and the detachment of the UE 11 must be accomplished through a detachment procedure. Therefore, in this embodiment, the MME 15 has transmitted the first authentication vector 201 to the UE 11 in advance during a previous detachment procedure performed by the UE 11. However, in other embodiments, the MME 15 may also transmit the first authentication vector 201 to the UE 11 through other procedures than the detachment procedure 42.

The detachment procedure 42 may be initiated by one of the UE 11 and the MME 15. In a case when the detachment procedure 42 is initiated by the UE 11, the UE 11 may transmit a detach request signaling to the MME 15, and then the MME 15 may transmit a detach accept signaling which comprises the first authentication vector 201 to the UE 11 in response to the detach request signaling. On the other hand, in a case when the detachment procedure 42 is initiated by the MME 15, the MME 15 may transmit a detach request signaling which comprises the first authentication vector 201 to the UE 11, and then the UE 11 may transmit a detach accept signaling to the MME 15 in response to the detach request signaling.

After having acquired the authentication vector 20, the MME 15 may transmit the second authentication vector 202 to the eNodeB 13 in advance through a UE context release procedure 44. As described above, the detachment of the UE 11 must be accomplished through a detachment procedure; and after the UE 11 is detached, the resource needed for the UE 11 may be released by the eNodeB 13 through the UE context release procedure 44. Therefore, during the UE context release procedure 44, the eNodeB 13 may transmit a UE context release command signaling to the MME 15, and then the MME 15 transmits a UE context release complete signaling which comprises the second authentication vector 202 to the eNodeB 13 in response to the UE context release command.

If the UE 11 is to enter the attachment procedure 46 with the eNodeB 13, the MME 15 and the HSS 17 after the first authentication vector 201 is received by the UE 11 and the second authentication vector 202 is received by the eNodeB 13, an authentication procedure 461 needed in the attachment procedure 46 will be simplified as being performed only between the UE 11 and the eNodeB 13. More specifically, during the attachment procedure 46, the eNodeB 13 may transmit a UE identifier 22 to the UE 11 so that the eNodeB 13 identifies the UE 11 according to the UE identifier 22. In other embodiments, the eNodeB 13 may also transmit the UE identifier 22 to the UE 11 in advance before the UE 11 enters the attachment procedure 46. After the UE identifier 22 is received by the UE 11, the UE 11 can complete an authentication procedure 461 with the eNodeB 13 according to the UE identifier 22 and all or a part of the contents of the authentication vector 20.

Figure 3:
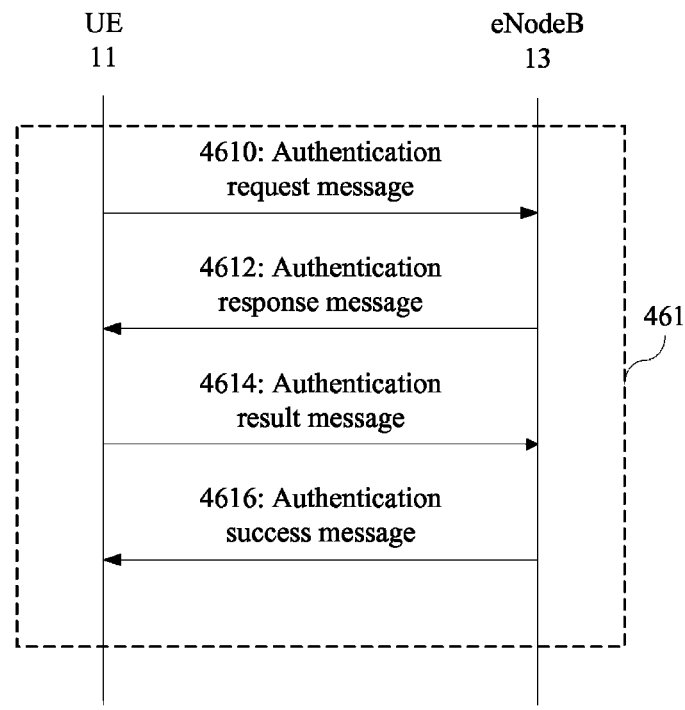
FIG. 3 is a schematic view illustrating specific operations of an authentication procedure 461 shown in FIG. 2.

FIG. 3 is a schematic view illustrating specific operations of the authentication procedure 461. As shown in FIG. 3, the UE 11 may transmit an authentication request message 4610 to the eNodeB 13 according to the UE identifier 22. Then, the eNodeB 13 may confirm the identity of the UE 11 according to the authentication request message 4610 and transmit an authentication response message 4612 to the UE 11 according to the authentication request message 4610. The authentication request message 4610 transmitted to the eNodeB 13 may directly carry the UE identifier 22. However, the authentication request message 4610 transmitted to the eNodeB 13 may not carry the UE identifier 22 but carry other information which is related to the UE identifier 22 and allows the eNodeB 13 to identify the identity of the UE 11. Then, the UE 11 may transmit an authentication result message 4614 to the eNodeB 13 according to the information of the first authentication vector 201 and the authentication response message 4612. For example, the UE 11 may calculate a response (RES) according to a random value and an authentication symbol comprised in the first authentication vector 201 and then transmits the RES to the eNodeB 13 by carrying the RES in the authentication result message 4614. After the authentication result message 4614 is received by the eNodeB 13, the eNodeB 13 may determine whether the RES is consistent with the expected RES comprised in the authentication vector 20. If it is determined that the two RESs are consistent with each other, the eNodeB 13 may transmit an authentication success message 4616 to the UE 11 according to the authentication result message 4614 to notify the UE 11 that the authentication procedure is successful.

According to the basic architecture of the LTE technology of 3GPP, the UE 11 must complete a radio resource control connection setup procedure with the eNodeB 13 during the attachment procedure 46 performed by the UE 11. Therefore, the authentication procedure 461 may be incorporated into the radio resource control connection setup procedure. However, in other embodiments, the authentication procedure 461 may also be performed separately from the radio resource control connection setup procedure.

In as case where the authentication procedure 461 is incorporated into the radio resource control connection setup procedure, the authentication request message 4610 may be considered as a radio resource control connection request message, the authentication response message 4612 may be considered as a radio resource control connection setup message, the authentication result message 4614 may be considered as a radio resource control connection setup complete message, and the authentication success message 4616 may be considered as a radio resource control connection reconfiguration message.

Figure 4:
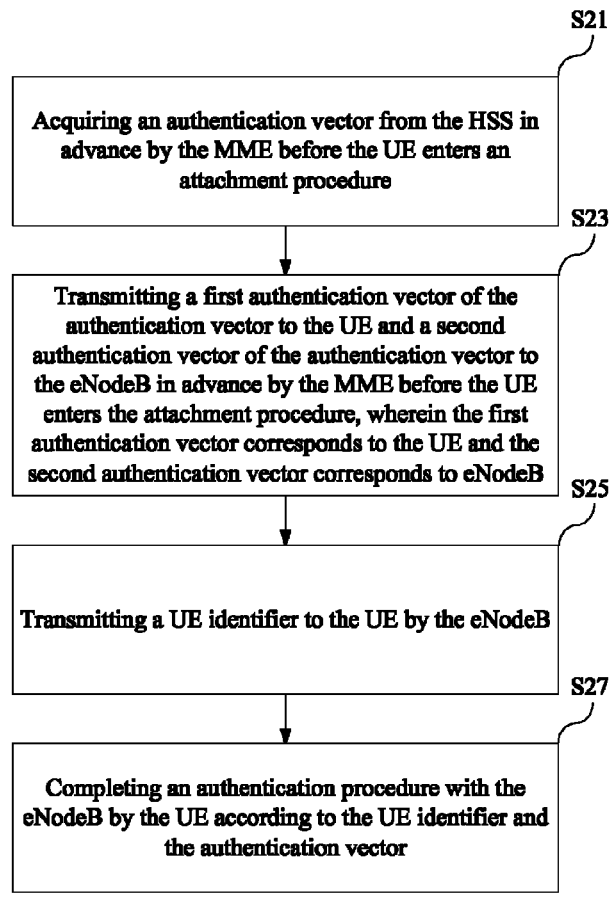
FIG. 4 is a flowchart diagram of an authentication method for use in a wireless communication system according to an embodiment of the present invention.

Another embodiment of the present invention (called "a second embodiment" for short) is an authentication method for use in a wireless communication system. The wireless communication system may comprise at least one UE, at least one eNodeB, at least one HSS and at least one MME. For example, the second embodiment may be an authentication method for use in the wireless communication system 1 of the first embodiment. FIG. 4 is a flowchart diagram of the authentication method. As shown in FIG. 4, the authentication method comprises: a step S21 of acquiring an authentication vector from the HSS in advance by the MME before the UE enters an attachment procedure; a step S23 of transmitting a first authentication vector of the authentication vector to the UE and a second authentication vector of the authentication vector to the eNodeB in advance by the MME before the UE enters an attachment procedure, wherein the first authentication vector corresponds to the UE and the second authentication vector corresponds to the eNodeB; a step S25 of transmitting a UE identifier to the UE by the eNodeB; and a step S27 of completing an authentication procedure with the eNodeB by the UE according to the UE identifier and the authentication vector.

In other embodiments, the step S21 may further comprise the following step of: acquiring the authentication vector from the HSS in advance by the MME through an authentication data procedure before the UE enters an attachment procedure.

In other embodiments, the step S23 may further comprise the following step of: transmitting the first authentication vector to the UE in advance by the MME through a detachment procedure before the UE enters an attachment procedure. Optionally, the detachment procedure may be initiated by one of the UE and the MME.

In other embodiments, the step S23 may further comprise the following step of: transmitting the second authentication vector to the eNodeB in advance by the MME through a UE context release procedure before the UE enters an attachment procedure.

In other embodiments, the step S27 may further comprise the following steps of: transmitting an authentication request message to the eNodeB by the UE according to the UE identifier; transmitting an authentication response message to the UE by the eNodeB according to the authentication request message; transmitting an authentication result message to the eNodeB by the UE according to the first authentication vector and the authentication response message; transmitting an authentication success message to the UE by the eNodeB according to the authentication result message.

In other embodiments, the authentication procedure may be a radio resource control connection setup procedure, the authentication request message may be a radio resource control connection request message, the authentication response message may be a radio resource control connection setup message, the authentication result message is a radio resource control connection setup complete message, and the authentication success message may be a radio resource control connection reconfiguration message.

In addition to the aforesaid steps, the authentication method of the second embodiment can also execute steps corresponding to all the operations of the wireless communication system 1 of the first embodiment. The method in which the second embodiment executes these corresponding steps will be readily appreciated by those of ordinary skill in the art based on the explanation of the first embodiment, and thus will not be further described herein.

According to the above descriptions, the present invention provides a wireless communication system and an authentication method thereof. More specifically, before a UE enters an attachment procedure, the present invention transmits information (e.g., an authentication vector) needed to be provided by an HSS during an authentication procedure to an MME in advance; and the MME also transmits the information to the UE and the eNodeB in advance. In this way, when the UE enters the attachment procedure, the authentication procedure will be simplified as being performed only between the UE and the eNodeB, so signaling exchanges needed in the conventional authentication procedure are effectively simplified. On the basis of the aforesaid operations, the present invention provides at least the following benefits: the load of the core network can be reduced; and the power consumption of the UE having a high switching frequency (e.g., a machine to machine device) can be reduced.

The above disclosure is related to the detailed technical contents and inventive features thereof. People skilled in this field may proceed with a variety of modifications and replacements based on the disclosures and suggestions of the invention as described without departing from the characteristics thereof. Although such modifications and replacements are not fully disclosed in the above descriptions, they have substantially been covered in the following claims as appended.

What is claimed is:

1. A wireless communication system, comprising:
   a User Equipment (UE);
   an Evolved Node Base Station (eNodeB);
   a Home Subscriber Server (HSS); and
   a Mobility Management Entity (MME), being configured to, before the UE enters an attachment procedure, acquire an authentication vector from the HSS in advance and transmit a first authentication vector of the authentication vector to the UE and a second authentication vector of the authentication vector to the eNodeB in advance, the first authentication vector corresponding to the UE and the second authentication vector corresponding to the eNodeB;

wherein the eNodeB is configured to transmit a UE identifier to the UE, and the UE is configured to complete an authentication procedure with the eNodeB according to the UE identifier and the authentication vector.

2. The wireless communication system as claimed in claim 1, wherein the MME is configured to acquire the authentication vector from the HSS in advance through an authentication data procedure.

3. The wireless communication system as claimed in claim 1, wherein the MME transmits the first authentication vector to the UE in advance through a detachment procedure.

4. The wireless communication system as claimed in claim 3, wherein the detachment procedure is initiated by one of the UE and the MME.

5. The wireless communication system as claimed in claim 1, wherein the MME transmits the second authentication vector to the eNodeB in advance through a UE context release procedure.

6. The wireless communication system as claimed in claim 1, wherein the UE transmits an authentication request message to the eNodeB according to the UE identifier, the eNodeB transmits an authentication response message to the UE according to the authentication request message, the UE transmits an authentication result message to the eNodeB according to the first authentication vector and the authentication response message, and the eNodeB transmits an authentication success message to the UE according to the authentication result message to complete the authentication procedure.

7. The wireless communication system as claimed in claim 6, wherein the authentication procedure is a radio resource control connection setup procedure, the authentication request message is a radio resource control connection request message, the authentication response message is a radio resource control connection setup message, the authentication result message is a radio resource control connection setup complete message, and the authentication success message is a radio resource control connection reconfiguration message.

8. An authentication method for use in a wireless communication system, the wireless communication system comprising an User Equipment (UE), an Evolved Node Base Station (eNodeB), a Home Subscriber Server (HSS), and a Mobility Management Entity (MME), the authentication method comprising:
   (a) acquiring an authentication vector from the HSS in advance by the MME before the UE enters an attachment procedure;
   (b) transmitting a first authentication vector of the authentication vector to the UE and a second authentication vector of the authentication vector to the eNodeB in advance by the MME before the UE enters the attachment procedure, wherein the first authentication vector corresponds to the UE and the second authentication vector corresponds to eNodeB;
   (c) transmitting a UE identifier to the UE by the eNodeB; and
   (d) completing an authentication procedure with the eNodeB by the UE according to the UE identifier and the authentication vector.

9. The authentication method as claimed in claim 8, wherein the step (a) includes acquiring the authentication vector from the HSS in advance by the MME through an authentication data procedure before the UE enters an attachment procedure.

10. The authentication method as claimed in claim 8, wherein step (b) includes transmitting the first authentication vector to the UE in advance by the MME through a detachment procedure before the UE enters an attachment procedure.

11. The authentication method as claimed in claim 10, wherein the detachment procedure is initiated by one of the UE and the MME.

12. The authentication method as claimed in claim 8, wherein step (b) includes transmitting the second authentication vector to the eNodeB in advance by the MME through a UE context release procedure before the UE enters an attachment procedure.

13. The authentication method as claimed in claim 8, wherein step (d) includes:
   transmitting an authentication request message to the eNodeB by the UE according to the UE identifier;
   transmitting an authentication response message to the UE by the eNodeB according to the authentication request message;
   transmitting an authentication result message to the eNodeB by the UE according to the first authentication vector and the authentication response message; and
   transmitting an authentication success message to the UE by the eNodeB according to the authentication result message.

14. The authentication method as claimed in claim 13, wherein the authentication procedure is a radio resource control connection setup procedure, the authentication request message is a radio resource control connection request message, the authentication response message is a radio resource control connection setup message, the authentication result message is a radio resource control connection setup complete message, and the authentication success message is a radio resource control connection reconfiguration message.

* * * * *